(12) United States Patent
Schwarz

(10) Patent No.: US 9,176,494 B2
(45) Date of Patent: Nov. 3, 2015

(54) SYSTEM AND METHOD OF COMMUNICATION FOR ELECTRONIC APPARATUSES

(75) Inventor: Marcos Guilherme Schwarz, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 824 days.

(21) Appl. No.: 13/320,647

(22) PCT Filed: May 12, 2010

(86) PCT No.: PCT/BR2010/000152
§ 371 (c)(1),
(2), (4) Date: Mar. 9, 2012

(87) PCT Pub. No.: WO2010/130018
PCT Pub. Date: Nov. 18, 2010

(65) Prior Publication Data
US 2012/0158194 A1 Jun. 21, 2012

(30) Foreign Application Priority Data

May 15, 2009 (BR) ..................................... 0901496

(51) Int. Cl.
*G05D 3/12* (2006.01)
*G05B 11/32* (2006.01)
(Continued)

(52) U.S. Cl.
CPC .. *G05B 19/0425* (2013.01); *G05B 2219/21155* (2013.01); *G05B 2219/25314* (2013.01); *G05B 2219/2613* (2013.01)

(58) Field of Classification Search
CPC ....... E21B 43/243; E21B 43/16; G05B 11/01; G05B 19/04; G05B 1/06; G05B 1/16; G05B 3/02; G05B 2219/25; G05B 2219/26; H02H 9/06; H03K 17/94; H04L 12/40
USPC .......... 700/68, 22, 268, 286; 361/11, 118, 64; 340/31, 82, 825, 538; 315/31, 312; 307/11, 149; 710/316, 104, 2, 300, 710/305, 38, 9
See application file for complete search history.

(56) References Cited

U.S. PATENT DOCUMENTS

| | | | |
|---|---|---|---|
| 5,600,310 A * | 2/1997 | Whipple et al. | ............. 340/3.51 |
| 2001/0038329 A1 | 11/2001 | Diamanti et al. | |
| 2004/0156159 A1 * | 8/2004 | Liebenow | ...................... 361/118 |
| 2007/0185589 A1 * | 8/2007 | Duarte et al. | .................... 700/22 |
| 2009/0115583 A1 * | 5/2009 | Chen | ........................ 340/310.11 |

FOREIGN PATENT DOCUMENTS

WO     WO 2005/106359     11/2005

OTHER PUBLICATIONS

International Search Report mailed Aug. 4, 2010 for International application No. PCT/BR2010/000152.
(Continued)

*Primary Examiner* — Mohammad Ali
*Assistant Examiner* — Md Azad
(74) *Attorney, Agent, or Firm* — Fay Sharpe LLP

(57) ABSTRACT

A communication system includes functional modules, wherein at least one functional module includes a processing unit and at least one functional module includes a controllable device. The modules are powered by an alternating voltage at a frequency and are electrically associated by a power bus and a communication bus. The processing unit provides a communication signal to the communication bus for interaction between the functional modules through a plurality of sets of high frequency pulses arranged to repeat at a predetermined repetition frequency substantially greater than the frequency of the voltage, and each set of high frequency pulses forms an information pulse corresponding to at least one bit of a communication protocol. Filters are disposed between an electric energy power supply and the functional modules for permitting the passage only of frequency components of an electric signal greater than the voltage frequency of the electric energy power supply.

22 Claims, 3 Drawing Sheets

(51) Int. Cl.
  *G05B 11/01* (2006.01)
  *H02H 3/00* (2006.01)
  *H01C 7/12* (2006.01)
  *H04Q 1/30* (2006.01)
  *G06F 13/00* (2006.01)
  *G06F 13/36* (2006.01)
  *G06F 5/00* (2006.01)
  *G05B 19/042* (2006.01)

(56) References Cited

OTHER PUBLICATIONS

Written Opinion mailed Aug. 4, 2010 for International application No. PCT/BR2010/000152.
International Preliminary Report on Patentability mailed Apr. 6, 2011 for International application No. PCT/BR2010/000152.

* cited by examiner

SYSTEM AND METHOD OF COMMUNICATION FOR ELECTRONIC APPARATUSES

The present invention refers to a system, capable of allowing communication between a plurality of functional modules of an electronic apparatus, immune to a potential failure event of the electric energy power source in which said electronic apparatus is connected to, in order to avoid damage to the internal components comprised by these functional modules.

The present invention also refers to a method of communication between a plurality of functional modules of an electronic apparatus, which avoids damage to the internal components comprised by these functional modules in the event of a failure of the electric power source in which said electronic apparatus is connected to.

DESCRIPTION OF THE STATE OF THE ART

Electronic apparatuses such as, for example, cooling equipment and home appliances, normally comprise a plurality of electrical/electro-mechanical loads and sensors, which are controlled according to a suitable logical sequence so that the apparatus executes the functions according to its design specifications.

Monitoring, handling and controlling the magnitudes captured by the sensors and the drive of the various loads is normally carried out by a control unit, such as a microcontroller or microprocessor, programmed according to the specific and particular characteristics of each apparatus.

Normally, said control unit should also be encompassed in a main electronic board designed exclusively and specifically to operate correctly therewith. For this reason, high costs and a long time to develop the apparatus are required, even more so bearing in mind that it has to be approved in the tests established in standards determined by national and/or international agencies in charge of the safety of apparatuses and users, which generally represents the critical path for the launch of a product on the market.

Additionally, any changes or functional improvements needed in more advanced versions or subsequent generations of the apparatus, or when new functions, sensors or loads are added thereto, again time and additional costs will be needed to carry out the changes required in the control unit and/or in the main electronic board. Further, the apparatus will have to be re-evaluated by the agencies in charge of product and user safety, which again requires additional cost, since it will undergo fresh tests. Additionally, the manufacturing process and adjustment/tuning routines for the apparatus will also require major adaptations which involve high costs.

In view of the problems mentioned above, the international patent document WO 2005/106359 discloses a system for use in electronic apparatuses, which has a modularity and expandability capacity, since it comprises functional modules parallely connected to each other by means of a power bus and a communication bus, such that additional loads and sensors can be included in the system without the need for altering the main board or the control unit program in a significant manner. Accordingly, the costs and development time/tests relating to the improvements and functional alterations to the apparatus can be reduced, besides dispensing with the need to submit the apparatus to new safety tests when a load or sensor is added, However, if there is any unexpected electrical failure in the system described in document WO 2005/106359, such as, for example, a bad contact or continuity interruption, it may cause a surge in its functional modules and, thus, important system components such as the control unit, sensors and/or loads may be permanently damaged, causing irreparable damage to the apparatus and major prejudice to the user.

Therefore, there is not yet known a system that has the modularity and expandability capacity allied with the capacity of immunity to electrical failures as may occur in the system.

OBJECTIVES OF THE INVENTION

Therefore, it is a first objective of this invention to provide a system to monitor and control multiple sensors and electronic apparatus loads, which has modularity and expandability capacity, and that is also immune to electrical failures (eg. surges) as may occur in the system.

It is a second objective of this invention to provide a system, immune to potential electrical failures (eg. surges) as may occur, which is capable of monitoring and controlling multiple sensors and electronic apparatus loads, and which also has modularity and expandability, so as to dispense with the need to submit the apparatus to fresh tests established in standards determined by the agencies in charge of product safety, when the product is altered or improved, so as to reduce time, costs and significantly simplify the process of developing and validating the apparatus.

It is a third objective of this invention to provide a system, immune to potential electrical failures (eg. surges) as may occur, which is capable of monitoring and controlling multiple sensors and loads of electronic apparatuses and which also permits (allows) connection to an external information network in a simple and easy manner, so as to enable the provision of information (for example, diagnosis information) on the operating status of the system's functional modules to the external network as well as to enable the partial or total control of the operating logics by the external network.

It is a fourth objective of this invention to provide a system that is immune to potential electrical failures (eg. surges) as may occur, which is capable of monitoring and controlling multiple sensors and loads of electronic apparatuses, and which also permits the addition of sensors and loads or functional modifications in a simple and easy manner, in order to permit the product to evolve rapidly with relatively reduced costs.

It is a fifth objective of the present invention to provide a method of communication of a plurality of functional modules of an electronic apparatus to each other, which prevents damage to the internal components comprised by these functional modules in the event of a failure (eg. surges) in the electric power source in which said electronic apparatus is connected to.

BRIEF DESCRIPTION OF THE INVENTION

The first, second, third and/or fourth objectives of the invention are achieved by providing a communication system for electronic apparatuses that comprises:

functional modules, at least one functional module having a processing unit, at least one functional module having a controllable device by the processing unit;

at least one electric energy power supply (source) arranged to provide alternating voltage to the functional modules at a predetermined frequency;

at least one power bus arranged to electrically associate an electric energy power supply to the functional modules;

at least one communication bus arranged to operatively associate the functional modules in parallel to each other;

a reference conductor shared by the power bus and by the communication bus; and frequency filters disposed between the electric energy power supply and the functional modules, the frequency filter being capable of permitting (allowing) the passage only of frequency components of an electric signal greater than the electric energy power supply voltage frequency, the processing unit being arranged to provide at least one communication signal to the communication bus, the communication signal being capable of permitting operative interaction of the functional modules to each other, the communication signal comprising a plurality of sets of high frequency pulses, the high frequency pulses being arranged to repeat at a predetermined repetition frequency, the repetition frequency being substantially greater than the frequency of the voltage provided by the electric energy power supply, each set of high frequency pulses being arranged to form (shape) an information pulse corresponding to at least one bit of a communication protocol.

Therefore, the system of the present invention can expand, reduce and alter both the number of loads driven as well as the number of sensors installed and also the working of the program (software), without the need for carrying out a new project and/or implement significant changes to the original design of the product or apparatus. Said system also enables the connection of a functional module of the interface kind capable of allowing the interaction of the apparatus with an external network, such as, for example, the Internet, for monitoring, maintenance and control. These characteristics make the invention a solution that has important advantages such as considerable reduction in time and cost when new models and more advanced versions of the same product are launched, since it will not be necessary for it to undergo fresh approval tests concerning the safety and reliability requirements.

The fifth objective of the present invention is achieved through a method of communication for electronic apparatuses, the electronic apparatus being provided with functional modules electrically associated to each other by means of a single power bus, the power bus being electrically associated to an electric energy power supply, the electric energy power supply being arranged to provide alternating voltage to the functional modules at a predetermined frequency, the method being characterized by comprising the following steps:

i) associate the functional modules operatively to each other by means of a single communication bus, the power bus and the communication bus sharing a reference conductor;

ii) provide a communication signal to the communication bus capable of permitting operative interaction between the functional modules;

iii) provide a plurality of information pulses, each information pulse corresponding to at least one bit of the communication signal;

iv) provide a plurality of sets of high frequency pulses to the communication bus which repeat at a predetermined repetition frequency, the repetition frequency being substantially greater than the frequency of the electric energy power supply voltage, each set of high frequency pulses being arranged to form an information pulse; and v) filter the passage of frequency components of the communication signal which are lower or equal to the electric energy power supply voltage frequency.

BRIEF DESCRIPTION OF THE DRAWINGS

The present invention will now be described in greater detail based on the drawings.

DETAILED DESCRIPTION OF THE DRAWINGS AND OF THE INVENTION

Figure 1:
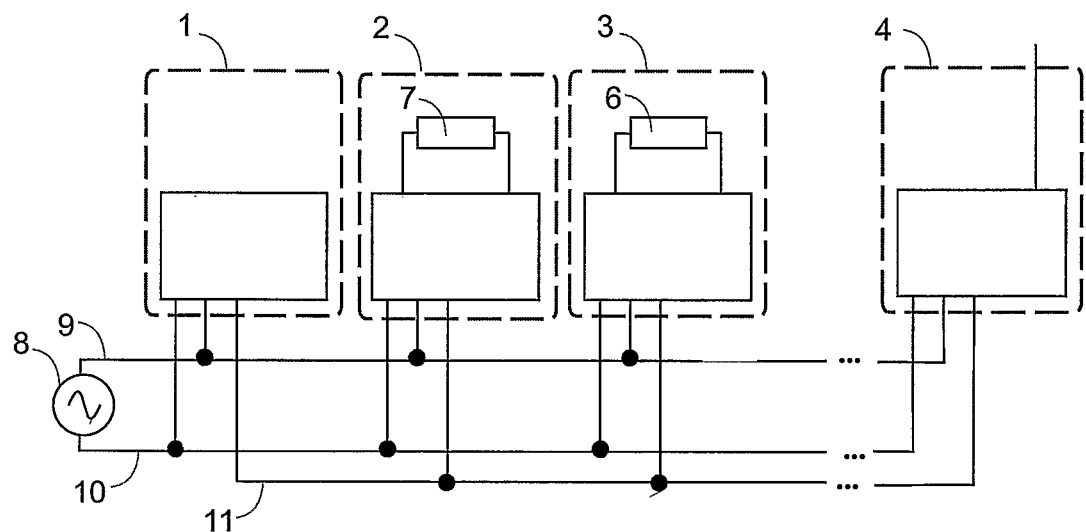
FIG. 1—illustrates a block diagram of the communication system for electronic apparatuses of the present invention.

The communication system for electronic apparatuses (equipment or appliances), object of the present invention, is illustrated schematically in FIG. 1.

Said system comprises a plurality of functional modules 1, 2, 3, 4, wherein at least one functional module 1, 2, 3, 4 has a processing unit 5. Additionally, at least one functional module 1, 2, 3, 4 has a controllable device 6, 7 which consists of a sensor 6 or a load 7 provided with a predetermined impedance. The processing unit 5 preferably consists of a programmable microcontroller or microprocessor capable of controlling at least one controllable device 6, 7, which can be disposed in any functional module 1, 2, 3, 4. Preferably, the system comprises a plurality of processing units 5 and controllable devices 6, 7.

Additionally, the system also comprises an electric energy power supply (source) 8 arranged to provide alternating voltage to the functional modules 1, 2, 3, 4 at a predetermined frequency. Normally, the frequency of the signal of this supply voltage varies between 50 Hz and 60 Hz, depending on the installation site of the electronic equipment. Obviously, other frequency values in this order of magnitude can be used, depending on the local installation conditions and the application of the equipment.

The functional modules 1, 2, 3, 4 are associated electrically to each other by means of at least one power bus 9, 10 which, in turn, is arrange to electrically associate the electric energy power supply 8 to the functional modules 1, 2, 3, 4. Thus, the power bus 9, 10 is responsible for conducting the electrical current of the electric energy power supply 8 to the functional modules 1, 2, 3, 4. The power bus 9, 10 comprises a phase conductor 9 and a reference conductor 10. Preferably, the system comprises a single power bus 9, 10, so as to reduce costs and optimize its performance, besides simplifying and facilitating the implementation of additional functional modules (expandability).

Additionally, the functional modules 1, 2, 3, 4 are also associated operatively to each other by means of a communication bus 11, 10 arranged so as to permit a parallel association the functional modules 1, 2, 3, 4 to each other. The communication bus 11, 10 comprises a data conductor 11 and a reference conductor 10. Preferably, the system comprises a single communication bus 11, 10, also in order to reduce costs and optimize its performance, besides simplifying and facilitating the implementation of additional functional modules (expandability).

Therefore, when there is a need to implement a load or additional sensor to the system, it will merely be necessary to connect a device of the load kind or of the sensor kind to the power bus 9, 10 and to the communication bus 11, 10 and provide the program that controls the system behavior with suitable parameters and instructions so that these additional components can operate adequately and in a integrated manner to the system.

In this sense, apparatuses/systems with different degrees of complexity, different numbers of loads and sensors can be controlled by the solution proposed in this invention without the need for a new specific electronic control design.

It is important to note that the reference conductor 10 is shared by the power bus 9, 10 and by the communication bus 11, 10.

In a preferred embodiment of the present invention, shown in FIG. 1, the electronic equipment comprises four functional modules 1, 2, 3, 4, namely:

a main functional module 1 which consists of the central monitoring and control unit of the system. The main functional module 1 is capable of periodically signaling the instant that the information packages are applied to the communication bus 11, 10, so as to instruct which functional module 2, 3, 4 should execute an operation or transmit a datum to another functional module 1, 2, 3, 4. Said functionality is made possible by the operation of the processing unit 5;

a functional actuation module 2 having at least a load 7 which may consist of a ventilator, lamp, electrical resistance, electro-mechanical actuator, among others. Preferably, the functional actuation module 2 is also provided with a processing unit 5;

a functional measuring module 3 having at least a sensor 6 which may consist of temperature gauge, pressure gauge, vibration or acoustic pressure gauge, proximity sensor, among others. Preferably, the functional measuring module 3 is also provided with a processing unit 5; and a functional interface module 4 arranged to permit operative interaction between the electronic equipment and at least a means of monitoring and/or external control, in order to enable local connection with an external equipment or remote connection by means of the Internet, infra-red, bluetooth, Zigbee, wi-fi or mobile telephone networks for working maintenance/testing and/or remote control.

Therefore, the main functional module 1 periodically indicates by way of an appropriate voltage signal, which will be explained in detail ahead, the instant in which another functional module 2, 3, 4 should execute a determined operation, such as, for example, the instant in which the electric power should flow from the power bus 9, 10 to the load 7, or the instant in which the functional measuring module 3 should inform the magnitude value that is being measured in the sensor 6 or the instant in which the functional interface module 4 should request information or provide information coming from other external equipment by way of the communication bus 11, 10.

Figure 2:
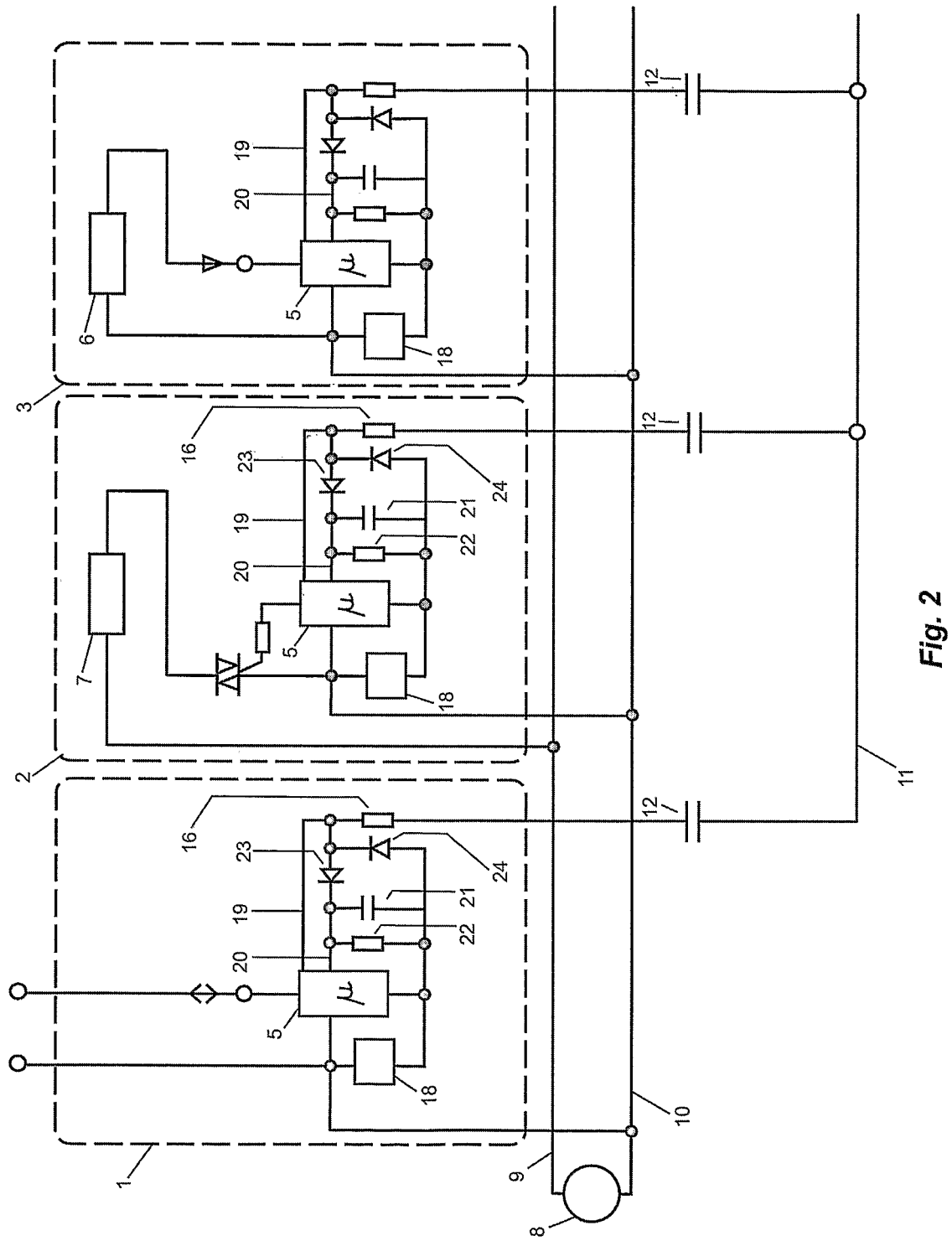
FIG. 2—illustrates a simplified electrical scheme of the communication system for electronic apparatuses of the present invention.

As can be noted in FIG. 2, the system also comprises frequency filters 12, disposed between the electric energy power supply 8 and the functional modules 1, 2, 3, 4, capable of permitting the passage only of components of an electric signal having frequencies substantially greater than the voltage frequency of the electric energy power supply 8. Accordingly, the frequency filters 12 have the function of indirectly protecting the functional modules 1, 2, 3, 4 and their components and internal elements such as, for example, the controllable devices 6, 7, against surges which may occur in the power bus 9, 10. According to a preferred embodiment of the present invention, the frequency fitter 12 consists of a decoupling capacitor having a specific value capable of permitting the passage only of components of an electric signal having frequencies greater than the voltage frequency of the electric energy power supply 8. The frequency filter 12 is associated to a resistor 16 scaled to limit the electrical current of the circuit, avoiding damage of the components and internal elements of each functional module 1, 2, 3, 4.

Thus, the communication between the functional modules 1, 2, 3, 4 should pass through the frequency filter 12 (decoupling capacitor) appropriately scaled to permit the isolation of such high voltage levels as the voltage peak (surges) coming from the electrical power source 8. Accordingly, in the event of a failure in the connection to the power bus 9, 10, the elements and components of the functional modules 1, 2, 3, 4 will not be damaged by the surges, since the current circulating through the filter 12 will be relatively low, avoiding any kind of damage to the functional module 1, 2, 3, 4. Said damage would occur in an electronic circuit linked to the data conductor 11, because in the event of an interruption of the phase conductor 9, the voltage level between the reference conductors 10 and the data conductor 11 (normally to the order of 5 volts) would be forced to rise to a value near or equal to that supplied by the electric energy power supply 8, due to the electric current conduction through any of the connected loads 7 or sensors 6.

Concerning the way of communication between the functional modules 1, 2, 3, 4, the processing unit 5 is arranged, through its programming, to provide at least a communication signal 13 to the communication bus 11, 10 so as to permit the operative interaction of the functional modules 1, 2, 3, 4 to each other. More specifically, the processing unit 5 is provided with a data output terminal 19 arranged to send the communication signal 13 to other functional modules 1, 2, 3, 4. Additionally, the processing unit 5 is provided with a data input terminal 20 arranged to receive the communication signal 13 from the other functional modules 1, 2, 3, 4.

Figure 3:
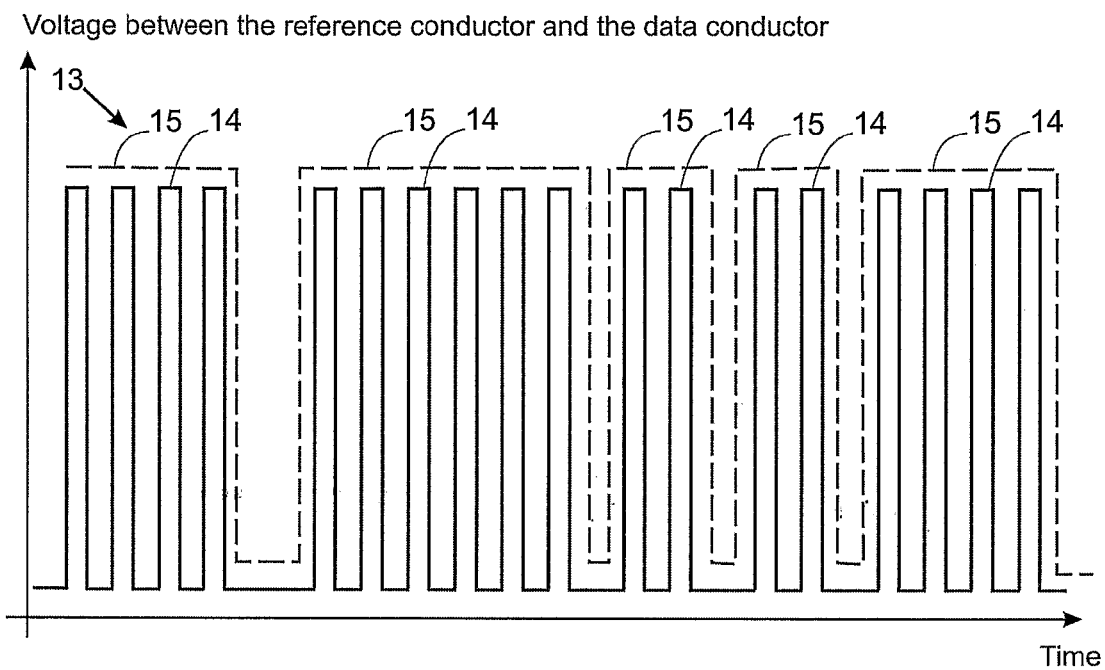
FIG. 3—illustrates a graph of a communication signal between the functional modules comprised by the system illustrated in FIGS. 1 and 2, highlighting its high frequency pulses.

As can be seen in FIG. 3, the communication signal 13 comprises a plurality of sets of high frequency pulses 14 arranged to repeat at a predetermined repetition frequency which should be substantially greater than the voltage frequency provided by the power supply, that is, the value of the repetition frequency of the high frequency pulses 14 should consist of a substantially greater value than 60 Hz, preferably in the order of kHz to MHz.

Each set of high frequency pulses 14 is arranged to form (shape) an information pulse 15 corresponding to at least one bit of a pre-established communication protocol, that is, the information pulse 15 effectively consists of the datum (bit) that a determined functional module 1, 2, 3, 4 sends to another functional module 1, 2, 3, 4. It is important to note that the set of information bits forms an information package that obeys the communication protocol mentioned previously.

Figure 4:
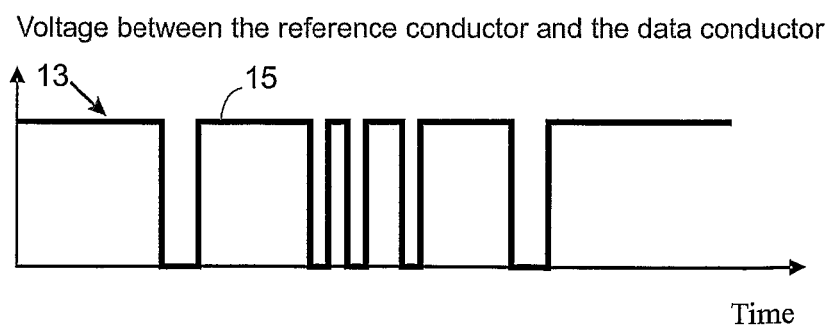
FIG. 4—illustrates a graph of a communication signal between the functional modules comprised by the system illustrated in FIGS. 1 and 2, highlighting just the envelope formed by the high frequency pulses illustrated in FIG. 3.

In FIG. 3, the information pulse 15 consists of the dotted line curve which externally involves the high frequency pulses 14 represented by the continuous line curve on the graph. FIG. 4 illustrates an example of the information pulses 15 which obey a predetermined specific communication protocol established by the program executed by the processing unit 5.

Hence, the information pulses 15 which form the information package are formed by the voltage modulation applied between the data conductor 11 and the reference conductor 10. This modulation consists of the variation in voltage between maximum and minimum levels in a sufficiently high frequency to allow clearly distinction from the digital pulses (voltage envelope) which form the information package.

Accordingly, the interaction between at least two functional modules 1, 2, 3, 4 allows the exchange or bidirectional digital information flow between them, enabled by means of sequential voltage envelopes (information pulses 15) which comprise high frequency pulses 14 controlled through the program (software) executed by the processing unit 5.

Concerning the hardware, as per FIG. 2, the functional module 1, 2, 3, 4 has a capacitor 21 and a resistor 22 associated to each other to support the communication signal 13, in order to permit the formation of the voltage envelope. Additionally, the functional module 1, 2, 3, 4 is also provided with a set of rectifying diodes 23, 24 capable of permitting the provision of the communication signal 13 to the data input terminal 20.

Also seen in FIG. 2, the functional module 1, 2, 3, 4 comprises a continuous voltage source 18 capable of electrically powering its components and internal elements. This continuous voltage source 18, in turn, can be powered by a rectified electric signal of the communication signal itself 13 and/or of the alternating mains voltage coming from the electric energy power supply 8.

Therefore, the hardware-software combination of the system revealed by the present invention permits the formation of the communication signal 13, as well as the operative interaction of the functional modules 1, 2, 3, 4 to each other.

The method of communication executed by the system above described is also the object of protection of the present invention and comprises the following steps:

i) associate the functional modules 1, 2, 3, 4 operatively to each other by means of a single communication bus 11, 10, the power bus 9, 10 and the communication bus 11, 10 sharing a reference conductor 10;

ii) provide a communication signal 13 to the communication bus 11, 10 capable of permitting operative interaction between the functional modules 1, 2, 3, 4;

iii) provide a plurality of information pulses 15, each information pulse 15 corresponding to at least one bit of the communication signal 13, iv) provide a plurality of sets of high frequency pulses 14 to the communication bus 11, 10 which repeat at a predetermined repetition frequency, the repetition frequency being substantially greater than the frequency of the electric energy power supply voltage, each set of high frequency pulses (14) being arranged to form an information pulse 15; and v) filter the passage of the frequency components of the communication signal 13 which are lower or equal to the voltage frequency of the electric energy power supply 8.

It is important to underline that in conventional communication systems and methods, the voltage pulse consists of the voltage envelope itself (information pulse 15), that is, the voltage envelope does not comprise high frequency pulses arranged to repeat at a high frequency, such that each voltage pulse represents the bit itself (information) the user wishes to transmit. Accordingly, in conventional communication systems, it is not possible to implement the frequency filter, as it would filter information data (bits), which is obviously undesirable.

For example, considering a conventional communication system that comprises a plurality of functional modules, if there is a contact failure or continuity loss in the phase conductor of the power bus, a high voltage (eg. 110 V or 220 V) will arise between the phase conductor 9 and the reference conductor 10 in all the functional modules still connected to the power supply, which may damage its components and internal elements, since the system does not have immunity capacity.

In contrast, an important characteristic of the system of the present invention is its immunity to any installation failures and contact defects in the power bus due to the presence of the frequency filter 12, which can be suitably implemented in the system without compromising the correct working thereof, since the communication (information flow) between the functional modules 1, 2, 3, 4 is by means of high frequency pulses, as described previously.

Accordingly, the present invention provides in an unprecedented fashion said immunity characteristic allied with its modular and expandability capacity, besides enabling the monitoring/external control by local and/or remote equipment.

Having described an exemplary preferred embodiment, it should be understood that the scope of the present invention encompasses other possible variations, being limited only by the content of the claims appended hereto, potential equivalents being included therein.

The invention claimed is:

1. Communication system for electronic apparatuses, the system comprising:
   functional modules (1, 2, 3, 4), at least one of said functional modules (1, 2, 3, 4) comprising a processing unit (5), and at least one of said functional modules (1, 2, 3, 4) comprising a controllable device (6, 7) controllable by the processing unit (5);
   an electric energy power supply (8) arranged to provide alternating voltage to the functional modules (1, 2, 3, 4) at a predetermined frequency;
   a power bus (9, 10) arranged to electrically associate the electric energy power supply (8) to the functional modules (1, 2, 3, 4);
   a communication bus (11, 10) arranged to operatively associate the functional modules (1, 2, 3, 4) in parallel to each other; and
   a reference conductor (10) shared by the power bus (9, 10) and by the communication bus (11, 10);
   the system further comprising:
   high pass frequency filters (12) disposed between the electric energy power supply and the functional modules (1, 2, 3, 4), each frequency filter (12) being capable of permitting the passage only of frequency components of an electric signal greater than the electric energy power supply voltage frequency,
   the processing unit (5) being arranged to provide at least one communication signal (13) to the communication bus (11, 10), the communication signal (13) being capable of permitting operative interaction between the functional modules (1, 2, 3, 4),
   the communication signal (13) comprising a plurality of sets of high frequency pulses (14), the high frequency pulses (14) being arranged to repeat at a predetermined repetition frequency, the repetition frequency being substantially greater than the voltage frequency provided by the electric energy power supply, each set of high frequency pulses (14) having a variation in voltage between maximum and minimum levels,
   one or more variations forming a voltage modulation of the high frequency pulses (14), the voltage modulation being arranged to form information pulses (15), the information pulses (15) corresponding to at least one bit of a communication protocol, the at least one bit of a communication protocol forming a voltage envelope.

2. The system according to claim 1, wherein the controllable device (6, 7) comprises a sensor (6) or a load (7).

3. The system according to claim 1, wherein said power bus (9, 10) comprises a single power bus arranged to electrically associate an electric energy power supply (8) to the functional modules (1, 2, 3, 4).

4. The system according to claim 1, wherein said communication bus (11, 10) comprises a single communication bus arranged to operatively associate the functional modules (1, 2, 3, 4) to each other.

5. The system according to claim 1, wherein the frequency filter (12) comprises a decoupling capacitor having a specific value capable of permitting the passage only of components of an electric signal having greater frequencies than the electric energy power supply voltage frequency.

6. The system according to claim 1, wherein the functional modules (1, 2, 3, 4) comprise a functional interface module (4) arranged to permit the operative interaction between the electronic apparatus and at least one means of monitoring and/or external control.

7. The system according to claim 1, wherein the functional modules (1, 2, 3, 4) each comprise a continuous voltage source (18) capable of electrically powering its components and internal elements, the continuous voltage source (18) being powered by a rectified electric signal of the communication signal itself (13) and/or of the alternating voltage coming from the electric energy power supply (8).

8. Communication method for electronic apparatuses, the electronic apparatus being provided with functional modules (1, 2, 3, 4) electrically associated to each other by means of a single power bus (9, 10), the power bus (9, 10) being electrically associated to an electric energy power supply (8), the electric energy power supply (8) being arranged to provide alternating voltage to the functional modules (1, 2, 3, 4) at a predetermined frequency, the method comprising the following steps:
  i) associating the functional modules (1, 2, 3, 4) operatively to each other by means of a single communication bus (11, 10), the power bus (9, 10) and the communication bus (11, 10) sharing a reference conductor (10);
  ii) providing a communication signal (13) to the communication bus (11, 10) capable of permitting operative interaction between the functional modules (1, 2, 3, 4); and
  iii) providing a plurality of information pulses (15), each information pulse (15) corresponding to at least one bit of the communication signal (13);
  the method further comprising the following steps:
  iv) providing a plurality of sets of high frequency pulses (14) to the communication bus (11, 10) which repeat at a predetermined repetition frequency, the repetition frequency being substantially greater than the frequency of the electric energy power supply voltage, the plurality of sets of high frequency pulses (14) having a variation in voltage between maximum and minimum levels, one or more variations forming a voltage modulation of the high frequency pulses (14), the voltage modulation being arranged to form information pulses (15), the information pulses (15) corresponding to at least one bit of a communication protocol, the at least one bit of a communication protocol forming a voltage envelope; and
  v) filtering the passage of frequency components of the voltage envelope of the communication signal (13) which are lower or equal to the electric energy power supply voltage frequency.

9. The system according to claim 2, wherein said power bus (9, 10) comprises a single power bus arranged to electrically associate an electric energy power supply (8) to the functional modules (1, 2, 3, 4).

10. The system according to claim 2, wherein said communication bus (11, 10) comprises a single communication bus arranged to operatively associate the functional modules (1, 2, 3, 4) to each other.

11. The system according to claim 3, wherein said communication bus (11, 10) comprises a single communication bus arranged to operatively associate the functional modules (1, 2, 3, 4) to each other.

12. The system according to claim 2, wherein the frequency filter (12) comprises a decoupling capacitor having a specific value capable of permitting the passage only of components of an electric signal having greater frequencies than the electric energy power supply voltage frequency.

13. The system according to claim 3, wherein the frequency filter (12) comprises a decoupling capacitor having a specific value capable of permitting the passage only of components of an electric signal having greater frequencies than the electric energy power supply voltage frequency.

14. The system according to claim 4, wherein the frequency filter (12) comprises a decoupling capacitor having a specific value capable of permitting the passage only of components of an electric signal having greater frequencies than the electric energy power supply voltage frequency.

15. The system according to claim 2, wherein the functional modules (1, 2, 3, 4) comprise a functional interface module (4) arranged to permit the operative interaction between the electronic apparatus and at least one means of monitoring and/or external control.

16. The system according to claim 3, wherein the functional modules (1, 2, 3, 4) comprise a functional interface module (4) arranged to permit the operative interaction between the electronic apparatus and at least one means of monitoring and/or external control.

17. The system according to claim 4, wherein the functional modules (1, 2, 3, 4) comprise a functional interface module (4) arranged to permit the operative interaction between the electronic apparatus and at least one means of monitoring and/or external control.

18. The system according to claim 5, wherein the functional modules (1, 2, 3, 4) comprise a functional interface module (4) arranged to permit the operative interaction between the electronic apparatus and at least one means of monitoring and/or external control.

19. The system according to claim 2, wherein the functional modules (1, 2, 3, 4) each comprise a continuous voltage source (18) capable of electrically powering its components and internal elements, the continuous voltage source (18) being powered by a rectified electric signal of the communication signal itself (13) and/or of the alternating voltage coming from the electric energy power supply (8).

20. The system according to claim 3, wherein the functional modules (1, 2, 3, 4) each comprise a continuous voltage source (18) capable of electrically powering its components and internal elements, the continuous voltage source (18) being powered by a rectified electric signal of the communication signal itself (13) and/or of the alternating voltage coming from the electric energy power supply (8).

21. Communication system for electronic apparatuses, the system comprising:
  functional modules (1, 2, 3, 4), at least one of said functional modules (1, 2, 3, 4) comprising a processing unit (5), and at least one of said functional modules (1, 2, 3, 4) comprising a controllable device (6, 7) controllable by the processing unit (5);
  an electric energy power supply (8) arranged to provide alternating voltage to the functional modules (1, 2, 3, 4);

a power bus (9, 10) arranged to electrically associate the electric energy power supply (8) to the functional modules (1, 2, 3, 4) at a predetermined voltage frequency;

a communication bus (11, 10) arranged to operatively associate the functional modules (1, 2, 3, 4) in parallel to each other; and a reference conductor (10) shared by the power bus (9, 10) and by the communication bus (11, 10);

the processing unit (5) being arranged to modulate at least one communication signal (13) to be transmitted through the communication bus (11, 10), such that an operative interaction between functional modules (1, 2, 3, 4) is established, the at least one communication signal (13) being a voltage modulation of a plurality of high frequency pulses (14) with the electric energy power supply voltage signal, the plurality of high frequency pulses (14) having a repetition frequency, the repetition frequency of the high frequency pulses (14) being substantially greater than the predetermined voltage frequency of the electric energy power supply voltage signal, the at least one communication signal (13) comprising information pulses (15) corresponding to at least one bit of a communication protocol, the at least one communication signal (13) being filtered by high pass frequency filters (12) disposed between the electric energy power supply and the functional modules (1, 2, 3, 4) such that:

the electric energy power supply voltage signal of the at least one communication signal (13) is removed; and the high frequency pulses (14) of the at least one communication signal (13) are maintained.

22. Communication method for electronic apparatuses, the electronic apparatus being provided with functional modules (1, 2, 3, 4) electrically associated to each other by means of a single power bus (9, 10), the power bus (9, 10) being electrically associated to an electric energy power supply (8), the electric energy power supply (8) being arranged to provide alternating voltage to the functional modules (1, 2, 3, 4) at a predetermined voltage frequency, the method comprising the following steps:

i) associating the functional modules (1, 2, 3, 4) operatively to each other by means of a single communication bus (11, 10), the power bus (9, 10) and the communication bus (11, 10) sharing a reference conductor (10);

ii) providing at least one communication signal (13) to be transmitted through the communication bus (11, 10), such that an operative interaction between functional modules (1, 2, 3, 4) is established, the at least one communication signal (13) being a voltage modulation of a plurality of high frequency pulses (14) with the electric energy power supply voltage signal, the plurality of high frequency pulses (14) having a repetition frequency, the repetition frequency of the high frequency pulses (14) being substantially greater than the predetermined voltage frequency of the electric energy power supply voltage signal;

iii) providing a plurality of information pulses (15), each information pulse (15) corresponding to at least one bit of the communication signal (13); and iv) filtering the at least one communication signal (13) by means of high pass frequency filters (12) disposed between the electric energy power supply and the functional modules (1, 2, 3, 4) such that:

the electric energy power supply voltage signal of the at least one communication signal (13) is removed; and the high frequency pulses (14) of the at least one communication signal (13) are maintained.

\* \* \* \* \*